United States Patent [19]
Sato et al.

[11] 4,171,896
[45] Oct. 23, 1979

[54] PHOTOGRAPHIC CAMERA WITH AN INFORMATION INDICATING FINDER

[75] Inventors: Yasuhisa Sato; Akira Tajima, both of Kawasaki; Yukiharu Ono, Yokohama, all of Japan

[73] Assignee: Canon Kabushiki Kaisha, Tokyo, Japan

[21] Appl. No.: 822,251

[22] Filed: Aug. 5, 1977

[30] Foreign Application Priority Data

Aug. 12, 1976 [JP] Japan .......................... 51/108288[U]

[51] Int. Cl.$^2$ ..................... G03B 13/06; G03B 17/20
[52] U.S. Cl. .................................. 354/225; 352/171; 354/289
[58] Field of Search .............. 354/219, 224, 225, 152, 354/155, 53–57, 199–201, 166, 289; 352/171

[56] References Cited

U.S. PATENT DOCUMENTS

| 3,590,703 | 7/1971 | Ono | 354/155 X |
| 3,630,134 | 12/1971 | Nakamura | 354/224 X |

Primary Examiner—John Gonzales
Attorney, Agent, or Firm—Toren, McGeady and Stanger

[57] ABSTRACT

In the disclosed camera, an SLR viewfinder displays exposure conditions by means of a translucent indicia carrier adjacent the focusing plate which defines the field of view of the finder. A light source illuminates the translucent indicia carrier and its light is passed by suitable lenses to a viewer. Ghost images of the indicia indications, which might be caused by indicia image light beams being internally reflected by the plate and lenses, are effectively eliminated by an optical deflector that orients light from the source along an optical axis parallel to or away from the light passing through the focusing plate's field of view. According to one embodiment of the invention, the light deflector is a prism. According to another, it is a mirror.

5 Claims, 5 Drawing Figures

PHOTOGRAPHIC CAMERA WITH AN INFORMATION INDICATING FINDER

BACKGROUND OF THE INVENTION

This invention relates to a reflex finder optical system for photographic and cinematographic cameras with an information display provided in or adjacent the finder field of view, and more particularly to improvements of such a system.

In present movie cameras and single lens reflex cameras, the finder displays a number of exposure condition indicia such as the adjusted values of the diaphragm aperture and shutter speed, the exposure range indicators and the checked value of the electrical power source voltage. The indicia are imaged in or near the finder field of view. These indicia lie in a plane coincident with the focusing plane of the finder optical system and are illuminated by a light source such as a small lamp. The lamp must of course occupy a space outside the view finder light beam but in the vicinity of the focusing plane. As a result, light rays from the source-illuminated indicia are then radiated onto a lens element next to the focusing plane at such large angles relative to an optical axis of the finder optical system that there is a great possibility of occurrence of a ghost image of the indicia in or near the field of view of the finder.

SUMMARY OF THE INVENTION

An object of the present invention is to provide a reflex finder optical system in which an image of exposure condition indicia is provided adjacent the field of view of the finder without introducing ghost images thereof.

Another object of the invention is to provide an illuminating optical arrangement for a large number of exposure condition indicia to be displayed at a time which can eliminate flare and ghost phenomena otherwise resulting from improper adjustment of the inclination angles of illuminating light rays.

DESCRIPTION OF PREFERRED EMBODIMENTS

Figure 1:
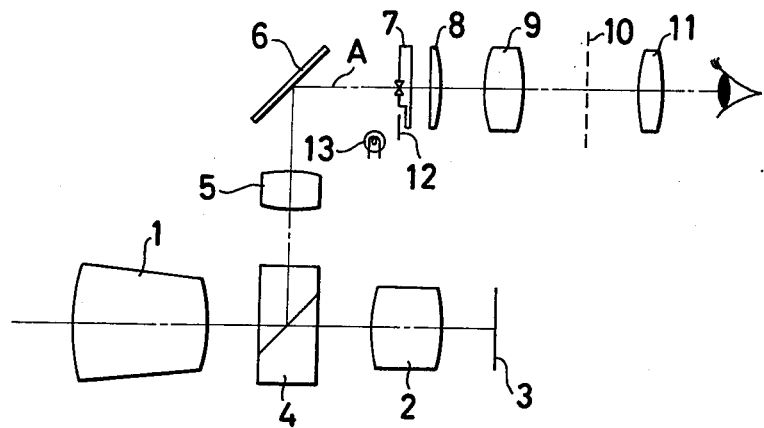
FIG. 1 is a schematic longitudinal sectional view of an example of an objective lens system and a finder optical system of a cinematographic camera provided with display of exposure condition indicia visible in the finder field of view and to which the present invention is applicable.
Figure 2:
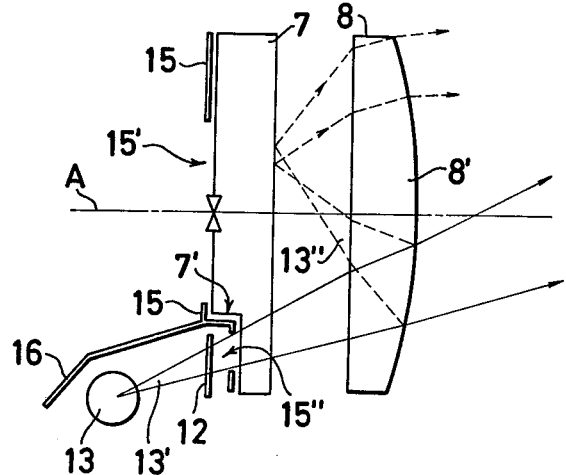
FIG. 2 shows an illuminating and projecting light arrangement for display of the exposure condition indicia of FIG. 1 according to the prior art.
Figure 3:
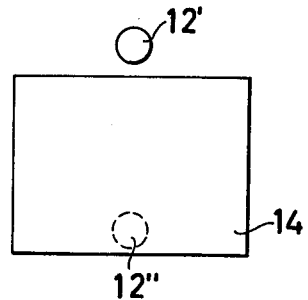
FIG. 3 is a plan view of a finder image field with normal and ghost images of the indicium array as seen through an ocular of the finder.

FIG. 1 shows a schematic example of an optical system for a cinematographic camera, FIG. 2 showing the light splitting effect of the field lens of FIG. 1 on the light rays from the indicium array illuminated by a conventional illuminating light arrangement, and FIG. 3 shows the ghost image in the lower marginal portion of the finder field of view.

The camera optical system includes a zoom type of objective lens composed of a zooming front lens group 1 from which an afocal light beam emerges and an infinitely focused relay lens group 2. This objective lens forms an image of a scene at an exposure plane on a photographic film 3. Positioned in a space between the front and rear lens groups 1 and 2 is a beam splitter 4 with a partly reflective surface in a diagonal interface thereof. The surface splits off a fraction of the beam of light from the front lens group 1 and directs it to a lens element 5. The latter serves as an objective lens of a finder optical system. The light emerging from the lens element 5 is reflected by a mirror 6 to a focusing screen 7. The latter coincides with a first image plane of the finder optical system and possesses a bi-prism located at the center of a framing aperture area. An image of the area of a scene intended to be photographed is formed on the screen 7.

In the finder optical system a field lens 8 is arranged a short distance to the rear of the focusing screen plate 7. An image erecting positive lens 9 refocuses the inverted image appearing on the focusing screen plate 7, onto a second image plane 10 as an erect image. An ocular 11 is arranged on a common optical axis A of the lenses 8 and 9.

The location at which the indicium array is positioned is indicated at 12. The conventional illuminating light arrangement comprises a light source or lamp 13 positioned on the side of the indicium array 12 opposite that of the light rays emerging from the focusing screen 7. The characters of the indicia may take the form of opaque or diffuse-transparent areas on a transparent background.

FIG. 2 shows enlarged details of the illuminating arrangement and light paths involved in the display of the indicium array 12 of FIG. 1. Because the area of the indicia necessary for display at any time is relatively large, it has been the common practice to locate the area as close as possible to the framing aperture area 15'. In order to make sure the light 13 reaches the focusing screen 7 through the framing aperture area 15', the light source or lamp 13 is located some distance from the plate 7 along the optical axis A. A light-shield wall 16 extends forwardly and diagonally from a frame structure wall 15.

The bottom of the frame structure 15 is configured to a cutout 7' of the focusing plate 7 which is adapted to accommodate an indicium carrying plate 12. The radial distance of the lower edge of an indicium display area defined by a window 15" of the frame structure 15 is short compared with the light source 13. This causes light rays from the indicium display area to radiate at angles with respect to the optical axis A large enough so that the rearwardly convex second surface 8' of the field lens 8 splits off a large proportion of an indicium image forming light beam. This allows portion 13" to enter the view finder image forming light beam after reflection from the rear surface of the focusing plate 7. Hence a ghost image of an area of the indicium array appears in the field of view of the finder as indicated by a dashed line circle 12" in FIG. 3. The ghost image corresponds to that area of the image of the indicium array which is indicated at 12'.

Figure 4:
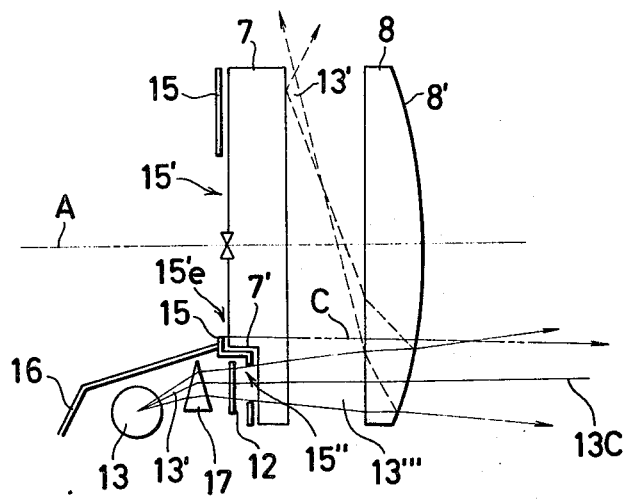
FIG. 4 is a schematic sectional view of one embodiment of an illuminating optical arrangement according to the present invention applied to the finder optical system of FIGS. 1 and 2.

In the illuminating optical arrangement of FIG. 4 a light-deflecting means in the form of a prism 17 is arranged in a space between a light source 13 and an array of exposure condition indicator 12 to be displayed with illumination by the light source 13. This prism 17 is oriented and dimensioned so that a beam of light rays 13''' radiating from the illuminated area of the indicia on the plate 12 is directed at its central axis 13c either exactly or nearly parallel to a marginal ray C. The latter passes over the lower margin 15'e of the framing aperture area 15' at a point closest to the central axis of the indicium image forming beam. The central axis 13c and the ray C are parallel or nearly so despite the fact that a line passing through the centers of the lamp 13 and the area of the indicium array makes a large negative angle with the marginal ray C. In other words, as the marginal ray C diverges somewhat at the exit surface of the focusing plate 7, the prism 17 serves to deflect an illuminating light beam 13' from the light source 13 in a direction either almost parallel to or somewhat divergent relative to the optical axis A.

With this illuminating optical arrangement, the second or rear surface of the field lens 8 does not introduce rays 13'' into the finder image forming light beam so that there is no possibility for a ghost image of the indicia appearing in the finder field of view.

Figure 5:
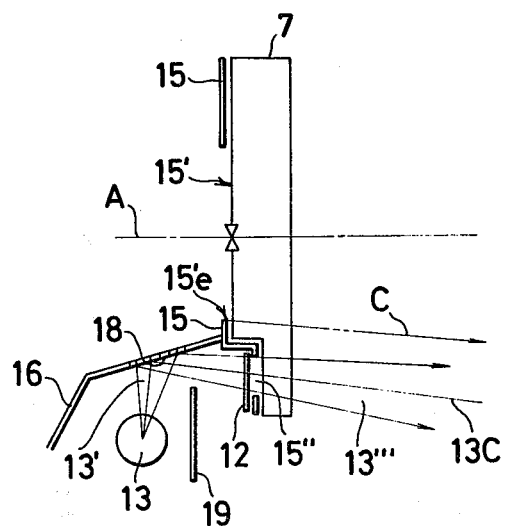
FIG. 5 is a schematic sectional view showing another embodiment of the invention.

FIG. 5 shows another embodiment of the present invention. Here the light-shield structure 16 of the same configuration as that of FIG. 4 is provided with a patch of a reflective coating applied on that surface thereof. The patch faces the light source 13 at a location in which light rays from the light source 13 and going to the indicium area result in production of an indicium image forming light beam 13''' equivalent in character to that of the beam produced by the prism 17 of FIG. 4. An opaque screen plate 19 prevents the light source 13 from directly illuminating the indicium array 12. This prevents the finder image forming light beam from producing the above-mentioned ghost phenomenon due to light rays coming directly from the light source 13.

It will be appreciated that the present invention contemplates the use of a light-deflecting means to increase the flexibility for location of the light source while still maintaining the finder image forming light beam unaffected by ghosts. This is accomplished by means which adjust the inclination angles of illuminating light rays for an array of exposure condition indicia to be displayed adjacent the finder field of view. The deflecting means provides a virtual image of the light source at a location at which the light source can not be positioned because the latter must not block the view finder light beam. Further, the invention achieves uniformity of luminance over the increased area of the indicium array to be displayed.

While embodiments of the invention have been described in detail it will be obvious to those skilled in the art that the invention may be embodied otherwise without departing from its spirit and scope.

What is claimed is:

1. A photographic camera with an information indicating finder comprising:
   a photographic lens having a front lens group having an optical axis;
   a reflecting surface behind said front lens group and inclined with respect to the optical axis;
   an observing optical system facing said reflecting surface and having an image surface, a focusing plate, a field lens, a data indicating means, a light source for illumination of said data indicating means, refracting means for refracting a light bundle, and an ocular;
   said focusing plate having a focusing plane coincident with said image surface, and said data indicating means being substantially coincident with said image surface;
   said refracting means being between said data indicating means and said light source for eliminating a reflection on a lens surface of said field lens; and said field lens being adjacent said focusing plane;
   a light-shielding means for shielding said light source, refracting means and said data indicating means from the scene light.

2. A photographic camera according to claim 1, wherein said refracting means is a prism, and a light bundle emanating from said light source passes through said prism to illuminate said data indicating means.

3. A photographic camera according to claim 1 in which a relay lens is provided between said field lens and said ocular.

4. A photographic camera with information indicating finder comprising:
   an afocal lens system having an axis;
   a basic lens focused for infinity and arranged on the optical axis of said afocal lens system;
   an image forming lens focused for infinity and disposed with its optical axis intersecting the optical axis of said afocal lens system at a point between said afocal lens system and said basic lens system;
   beam splitting means at the intersection for directing light from the axis of said afocal lens system to said image forming lens;
   reflecting means in the path of light from said beam splitting means in order to bend the optical path, said image forming lens defining an image surface;
   a focusing plate coincident with the image surface of said image forming lens;
   a field lens adjacent said focusing plate;
   a converging lens behind said field lens;
   an ocular behind said converging lens;
   a data indicating plate coincident with the image surface of said image forming lens;
   a light generating source for illuminating said indicating plate; and
   a prism arranged between said light source and said indicating plate to refract light from the source onto the plate;
   a light-shielding means for shielding said data indicating plate from the scene light.

5. A photographic camera with an information indicating finder comprising:
   an afocal lens portion;
   a basic lens behind said afocal lens portion and focused on infinity;
   a beam splitter positioned between said afocal lens portion and said basic lens;
   an objective lens facing said beam splitter;
   a reflecting means in the optical path;
   a focusing plate coincident with the image surface of said objective lens,
   a field lens adjacent said focusing plate;
   a relay lens behind said field lens;
   an ocular behind said relay lens;
   an information indicating means substantially coincident with the image surface of said objective lens;
   an electric-light converting means for illuminating said information indicating means;

a light reflector facing said electric-light converting means to reflect light from electric-light converting means onto the information indicating means to eliminate the reflection on a lens surface of said field lens;

a light-shielding means for shielding said electric-light converting means, said information indicating means and said light reflector from the scene light; and a masking means for masking direct light from said electric-light converting means to said information indicating means.

* * * * *